United States Patent [19]
Richter et al.

[11] Patent Number: 5,481,684
[45] Date of Patent: Jan. 2, 1996

[54] EMULATING OPERATING SYSTEM CALLS IN AN ALTERNATE INSTRUCTION SET USING A MODIFIED CODE SEGMENT DESCRIPTOR

[75] Inventors: David E. Richter, San Jose; Jay C. Pattin, Redwood City; James S. Blomgren, San Jose, all of Calif.

[73] Assignee: Exponential Technology, Inc., San Jose, Calif.

[21] Appl. No.: 277,905

[22] Filed: Jul. 20, 1994

Related U.S. Application Data

[63] Continuation-in-part of Ser. No. 179,926, Jan. 11, 1994.
[51] Int. Cl.$^6$ .................................................. G06F 9/30
[52] U.S. Cl. .................. 395/375; 395/500; 364/DIG. 1
[58] Field of Search .................................... 395/375, 500, 395/800, 700

[56] References Cited

U.S. PATENT DOCUMENTS

| | | | |
|---|---|---|---|
| 3,764,988 | 10/1973 | Omishi | 395/375 |
| 4,077,058 | 2/1978 | Appell et al. | 395/650 |
| 4,633,417 | 12/1986 | Wilburn et al. | 364/550 |
| 4,763,242 | 8/1988 | Lee et al. | 395/500 |
| 4,780,819 | 10/1988 | Kashiwagi | 395/500 |
| 4,794,522 | 12/1988 | Simpson | 395/500 |
| 4,812,975 | 3/1989 | Adachi et al. | 395/500 |
| 4,821,187 | 4/1989 | Ueda et al. | 395/375 |
| 4,841,476 | 6/1989 | Mitchell et al. | 395/500 |
| 4,876,639 | 10/1989 | Mensch, Jr. | 395/500 |
| 4,928,237 | 5/1990 | Bealkowski et al. | 395/500 |
| 4,942,519 | 7/1990 | Nakayama | 395/775 |
| 4,943,913 | 7/1990 | Clark | 395/700 |
| 4,972,317 | 11/1990 | Buonomo et al. | 395/375 |
| 4,992,934 | 2/1991 | Portanova et al. | 395/375 |
| 5,053,951 | 10/1991 | Nusinov et al. | 395/425 |
| 5,077,657 | 12/1991 | Cooper et al. | 395/500 |
| 5,097,407 | 3/1992 | Hino et al. | 395/375 |
| 5,136,696 | 8/1992 | Beckwith et al. | 395/375 |
| 5,167,023 | 11/1992 | de Nicolas et al. | 395/375 |
| 5,210,832 | 3/1993 | Maier et al. | 395/375 |
| 5,226,164 | 7/1993 | Nadas et al. | 395/800 |
| 5,230,069 | 7/1993 | Brelsford et al. | 395/400 |
| 5,241,636 | 8/1993 | Kohn | 395/375 |
| 5,255,379 | 10/1993 | Melo | 395/400 |
| 5,269,007 | 12/1993 | Hanawa et al. | 395/375 |
| 5,287,465 | 2/1994 | Kurosawa et al. | 275/375 |
| 5,291,586 | 3/1994 | Jen et al. | 395/500 |

OTHER PUBLICATIONS

Combining both micro-code and Hardwired control in RISC by Bandyophyay and Zheng, Sep. 1987 Computer Architecture News pp. 11–15.

Combining RISC and CISC in PC systems By Garth, Nov. 1991 IEEE publication (?) pp. 10/1 to 10/5.

A 5.6-MIPS Call-Handling Processor for Switching Systems by Hayashi et al., IEEE JSSC Aug. 1989.

*Primary Examiner*—Parshotam S. Lall
*Assistant Examiner*—Viet Vu
*Attorney, Agent, or Firm*—Stuart T. Auvinen

[57] ABSTRACT

The CISC architecture is extended to provide for segments that can hold RISC code rather than just CISC code. These new RISC code segments have descriptors that are almost identical to the CISC segment descriptors, and therefore these RISC descriptors may reside in the CISC descriptor tables. The global descriptor table in particular may have CISC code segment descriptors for parts of the operating system that are written in x86 CISC code, while also having RISC code segment descriptors for other parts of the operating system that are written in RISC code. An undefined or reserved bit within the descriptor is used to indicate which instruction set the code in the segment is written in. An existing user program may be written in CISC code, but call a service routine in an operating system that is written in RISC code. Thus existing CISC programs may be executed on a processor that emulates a CISC operating system using RISC code. A processor capable of decoding both the CISC and RISC instruction sets is employed. The switch from CISC to RISC instruction decoding is triggered when control is transferred to a new segment, and the segment descriptor indicates that the code within the segment is written in the alternate instruction set.

6 Claims, 5 Drawing Sheets

EMULATING OPERATING SYSTEM CALLS IN AN ALTERNATE INSTRUCTION SET USING A MODIFIED CODE SEGMENT DESCRIPTOR

BACKGROUND OF THE INVENTION—RELATED APPLICATIONS

This application is a Continuation-in-Part of copending application for a "Dual-Instruction-Set Architecture CPU with Hidden Software Emulation Mode", filed Jan. 11, 1994, U.S. Ser. No. 08/179,926, having a common inventor and assigned to the same assignee as the present application.

BACKGROUND OF THE INVENTION—FIELD OF THE INVENTION

The present invention relates to a dual-instruction-set processor, and more particularly to a method and apparatus for emulating operating system calls using instructions from a second instruction set.

BACKGROUND OF THE INVENTION—DESCRIPTION OF THE RELATED ART

An enormous base of software has been written for existing operating systems such as the DOS™ and Windows™ operating systems produced by Microsoft Corporation of Redmond, Wash. However, these operating systems presently must be executed on x86 microprocessors manufactured by Intel Corporation of Santa Clara, Calif., and others. The x86 architecture is an old complex instruction set computer (CISC) architecture and is quite different from today's highly optimized reduced instruction set computers (RISCs).

It is greatly desired to use newer RISC processors since they are potentially less expensive and faster. The PowerPC™ architecture by IBM, Motorola and Apple Computer uses a RISC instruction set. However, the PowerPC™ cannot directly execute programs written for x86 CISC operating systems such as DOS™ and Windows™. Emulation programs such as the SoftPC program by Insignia Corporation translate x86 CISC instructions to RISC instructions, but the performance is reduced relative to running x86 code directly.

A dual-instruction-set CPU was disclosed in the related application entitled "Dual-Instruction-Set Architecture CPU with Hidden Software Emulation Mode", filed Jan. 11, 1994, U.S. Ser. No. 08/179,926. That application is assigned to the same assignee as the present application. The dual-instruction set CPU contains hardware so that it can decode instructions from two entirely separate instruction sets.

What is desired is a method and apparatus to trigger a switch from one instruction set to another instruction set when a call to a support routine in an operating system is made.

SUMMARY OF THE INVENTION

The present invention allows code from a first instruction set to reside within a segment defined by a second instruction set. For example, RISC instruction code may reside within a CISC segment. The CISC architecture is extended to provide for segments that can hold RISC code or CISC code.

In a broad sense the present invention is directed toward a segment descriptor for a dual-instruction-set processor. The processor executes instructions from a first instruction set and a second instruction set that are substantially independent. The segment descriptor describes a segment in memory containing program code. The segment descriptor has a location indicating means for indicating a location of the segment in the memory; attribute indicating means for indicating attributes of access to the segment; and an instruction set indicating means for indicating that an instruction set of the program code located within the segment belongs to one of a first instruction set and a second instruction set.

The instruction set indicating means has a first state for indicating that the program code contains instructions from the first instruction set, and a second state for indicating that the program code contains instructions from the second instruction set. The program code in the segment contains instructions from one of the first instruction set and the second instruction set.

In another aspect of the present invention the first instruction set is a complex instruction set computer (CISC) instruction set while the second instruction set is a reduced instruction set computer (RISC) instruction set. The first instruction set has a first encoding of operations to opcodes, while the second instruction set has a second encoding of operations to opcodes. The first encoding of operations to opcodes is substantially independent from the second encoding of operations to opcodes. Thus the two instruction sets may be entirely separate and independent instruction sets.

An undefined or reserved bit within the segment descriptor is used for the instruction set indicating means to indicate which instruction set the program code in the segment is written in. The switch from CISC to RISC instruction decoding is triggered when control is transferred to a new segment, and the segment descriptor indicates that the code within the segment is written in the alternate instruction set.

The present invention allows an existing user program written in CISC code to call a service routine in an operating system that is written in RISC code. Thus existing CISC programs may be executed on a dual-instruction-set processor which can execute RISC code to emulate a CISC operating system.

DETAILED DESCRIPTION

Figure 1:
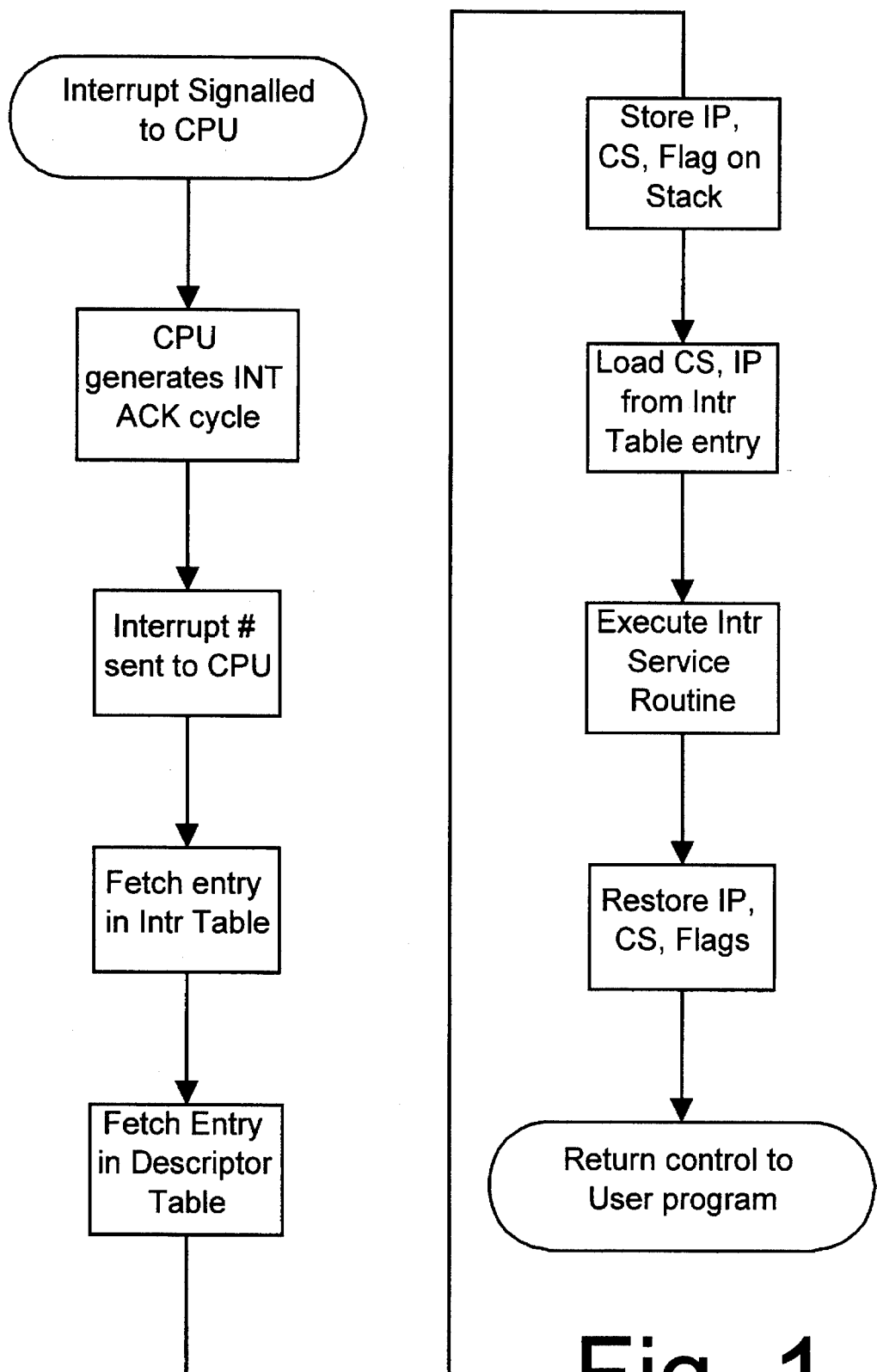
FIG. 1 shows the steps to service an x86 hardware interrupt.

The present invention relates to an improvement in processing. The following description is presented to enable one of ordinary skill in the art to make and use the present invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A dual-instruction-set CPU was disclosed in the related application entitled "Dual-Instruction-Set Architecture CPU with Hidden Software Emulation Mode", filed Jan. 11, 1994, U.S. Ser. No. 08/179,926, hereby incorporated by reference. That application is assigned to the same assignee as the present application. The dual-instruction set CPU contains hardware so that it can decode instructions from two entirely separate instruction sets. A page fault or exception would cause the instruction set being decoded to switch. Thus if a page fault occurred when the CISC instruction set was being decoded, execution would switch to the RISC instruction set. CISC instructions that were not directly supported in hardware would also cause a switch to the RISC instruction set.

Although the related application works effectively for many applications, calls from user programs to support routines in the x86 CISC operating system do not normally cause an exception or page fault to occur. Thus the support routines in the operating system would be executed from x86 CISC code. Since RISC code is believed to be more efficient than x86 CISC code, it would be preferable to execute as much code as possible in RISC rather than in CISC. Because of the enormous number of user programs written in x86 CISC code, it is not feasible to convert each program over to RISC code. Indeed, it is highly desirable to be able to execute unmodified user programs. However, most of these user programs use (or call) support routines that are supplied by the operating system. Since DOS™ and Windows™ are by far the most widely used operating systems on personal computers (PC's), it is desired to write RISC code for emulating the support routines in these two operating systems. Thus when an x86 CISC user program calls a support routine in either the DOS™ or Windows™ operating systems, the support routine could be written in the RISC code, improving performance over the original support routine written in x86 code. However, a method is needed to trigger the switch from decoding CISC instructions to decoding RISC instructions when the support routine is called.

The operating system (O/S), or possibly the Basic Input/Output System (BIOS), may provide support routines that a user program may access. The user program may transfer control to the operating system in the following ways:

Exception

External Interrupt

Software Interrupt

Far Call or Far Jump.

Each of these methods to transfer control from a user program to the operating system will be discussed next.

EXCEPTIONS

An exception occurs when an instruction is executed that causes some sort of error. A divide instruction that attempts to divide by zero would cause a divide-by-zero exception, invoking a service routine in the operating system to handle the error. The service routine in this case would typically display an error message to the user and terminate the program.

Other causes of exceptions include attempting to execute an undefined or illegal opcode, reaching a program check or break point, attempting to access memory that is out of the bounds for the segment, writing to a read-only segment, or accessing a segment that is valid but is not currently present in the system RAM. Page faults, where the page of memory being accessed is not present in the main memory but only on the disk, can also cause an exception.

The proper service routine is determined by accessing an interrupt table or interrupt descriptor table to fetch the starting address for the service routine for the particular exception. When an exception occurs, control is transferred to a service routine for the particular exception. The processor itself, however, supplies an entry number for an interrupt table.

EXTERNAL INTERRUPTS

An external device may signal an interrupt to the processor. For example, a user may strike a key on the keyboard, which would generate a keyboard interrupt to the processor. The processor will perform an external interrupt acknowledge cycle to allow the external device to identify an interrupt number. The interrupt number identifies an entry in the interrupt table which points to a service routine in the operating system for the external device.

SOFTWARE INTERRUPTS

A wide variety of O/S support routines may be accessed by programming a software interrupt into the user code. A software interrupt is an instruction that emulates a hardware interrupt. The software interrupt instruction causes the interrupt table to be accessed. The software interrupt instruction has a parameter that specifies a unique entry in the interrupt table. When an interrupt is encountered, the interrupt table is consulted to determine the address where the interrupt service routine is located in memory. The processor loads this address and begins executing instructions from this address, the location of the service routine. Upon completion of the service routine, control is transferred or returned back to the user program. Application programs running under DOS typically use software interrupt instructions to invoke DOS routines.

FAR CALLS AND JUMPS

Application programs running under Windows™ occasionally use software interrupts to invoke operating system routines, but the bulk of the Windows™ operating system routines are invoked by a far call instruction. For example, a user application may call the "CreateWindow" command while running under Windows™ to have a new window opened. The user application program executes a far call instruction to transfer control to a different segment where the Windows™ CreateWindow routine is located. A far call is a transfer of control to code which resides in a different segment, which also saves the instruction pointer and code segment register onto a stack in memory. The CreateWindow routine returns to the application program by executing a far return instruction, which restores the instruction pointer and code segment from the stack.

A segment descriptor is accessed and examined when a far call occurs, because control is transferred to a new segment. However, no interrupt is signaled.

INTERRUPT SERVICE ROUTINES

Many support routines supplied by the operating system are accessed when an external hardware interrupt is signaled to the processor. FIG. 1 shows the steps to service an x86 hardware interrupt. In the x86 architecture, only one pin or input to the processor is provided for most interrupts. Therefore, the processor must determine what the cause of the external interrupt is by generating an interrupt acknowledge cycle, when the external devices send an interrupt number or vector back to the processor. The interrupt vector specifies the device causing the interrupt, for example the keyboard. The interrupt vector is also known as an entry number, which specifies an entry in an interrupt table stored in memory. In the x86 architecture, the entry number is multiplied by eight, since each entry in the interrupt table occupies eight address locations, to specify the address of the entry in the interrupt table in memory. The entry stored in the interrupt table is a starting address where a support routine to service the interrupt is stored. The starting address of the interrupt service routine is loaded into the processor's instruction pointer and code segment register, while the old values for the instruction pointer and code segment register, and the flags register, are stored on a stack in memory.

The support routine is then executed starting with the instruction fetched from the starting address stored in the entry in the interrupt table. The support routine, or interrupt service routine, is executed, and control is returned to the user program when the end of the service routine is reached, by retrieving the old values for the instruction pointer, code segment and flags registers from the stack.

As an example, the user may strike a key on the keyboard. The keyboard controller would signal to the processor an interrupt request over the shared interrupt input. The processor then "services" this interrupt. First, an interrupt acknowledge cycle is run when the keyboard's interrupt number, 09 hex, is supplied to the processor. The interrupt number is multiplied by 8 hex, and the result, 48 hex, is tadded to the interrupt descriptor table base register, yielding the address of the keyboard's entry in the interrupt table. A memory cycle is run at this address to fetch the contents of the interrupt descriptor table entry number at 48 hex, and the contents are stored in the processor. The old instruction pointer, code segment and flags registers are stored to the stack, and then the contents of the keyboard's entry from the interrupt table are loaded into the instruction pointer and code segment register. Execution then transfers to the keyboard interrupt service routine pointed to by the contents of the keyboard's entry from the interrupt table, which is a starting address for the keyboard service routine. This routine performs an I/O read of the keyboard to determine which key was struck, and then terminates and returns control to the user program by retrieving the old instruction pointer, code segment and flags registers from the stack.

To service an x86 software interrupt, the steps are similar to those for the hardware interrupt of FIG. 1 except that an external interrupt acknowledge cycle is not necessary because the software interrupt instruction specifies the interrupt number and entry.

INTERRUPT TABLE DESCRIPTORS

The entries in the interrupt descriptor table are descriptors, similar to descriptors for segments. An offset address in the interrupt descriptor provides the entry point within the code segment jumped to. A selector field in the interrupt descriptor identifies the segment the interrupt service routine is located in. Privilege and access checks are performed for the interrupt descriptor just as they are done for segment descriptors. The interrupt descriptor table may contain a special descriptor, called a task gate, which causes the interrupt service routine to run in a separate context.

CISC CONTROL TRANSFERS TO RISC

A signal is needed to cause the processor to switch the instruction set being decoded. An exception or interrupt can provide this signal, or a separate instruction can be defined to switch instruction sets. Jumping from a CISC user program to another segment written in RISC code without signaling an interrupt or exception could cause unpredictable results or even a system crash unless a method is employed to trigger the switch to RISC decoding. Additionally, routines within the operating system may jump to other operating system routines that may not be implemented in RISC code but in CISC code. Ideally the type of code, RISC or CISC, would be indicated when a jump or control transfer occurs, regardless of what caused the jump.

When called from a CISC user program, the O/S service routine could begin with a special instruction to switch to the RISC instruction set. However, if this same O/S service routine were call from a RISC user program, then a separate entry point would be needed for the RISC program, because the special instruction to switch instruction sets should not be executed. Thus two entries would be needed for each O/S service routine. The RISC entry point could be the start of the service routine, but CISC programs would first have an entry point to execute the special instruction to switch to RISC code, and then jump to the RISC entry point. On return from the O/S service routine, CISC code would have to again execute a special instruction to switch back to CISC instruction decoding.

Having two entry points for each O/S service routine is undesirable as it increases the memory requirement for the interrupt table. Performance would decrease because parameters or return values passed to and from the O/S service routine could have to be copied, saved, or re-arranged in registers or memory. One or more additional instructions would have to be executed, also reducing performance. Maintaining and verifying the operating system would be more difficult.

Ideally either RISC or CISC code could use the same interrupt descriptor table and entry points. The O/S service routines would be independent of the user's instruction set.

The inventors have recognized all of these operating system calls cause a control transfer to a different segment. The switch to the RISC instruction set is therefore best triggered by loading the new segment descriptor. Each segment is written in either RISC or CISC code, and its segment descriptor indicates the instruction set for the code in that segment. Thus if a jump occurs to a segment that has a descriptor indicating RISC code, then the processor will switch to RISC decoding if it is currently decoding CISC. The cause of the jump, be it an interrupt, exception, or merely a far jump to another segment, is irrelevant; the target segment type will cause the proper instruction set to be decoded for the new segment.

X86 CISC SEGMENTATION

Segments are variable-sized blocks of memory, delineated by a segment base address and a bound or limit that is equal to the size or length of the segment. Segments can be of several types such as code, data, stack, or system management. The operating system typically manages segments by managing descriptors that identify the location and type of each segment. Segments can be used to protect one user or task from another, allowing for multi-user and multi-tasking systems.

Figure 3:
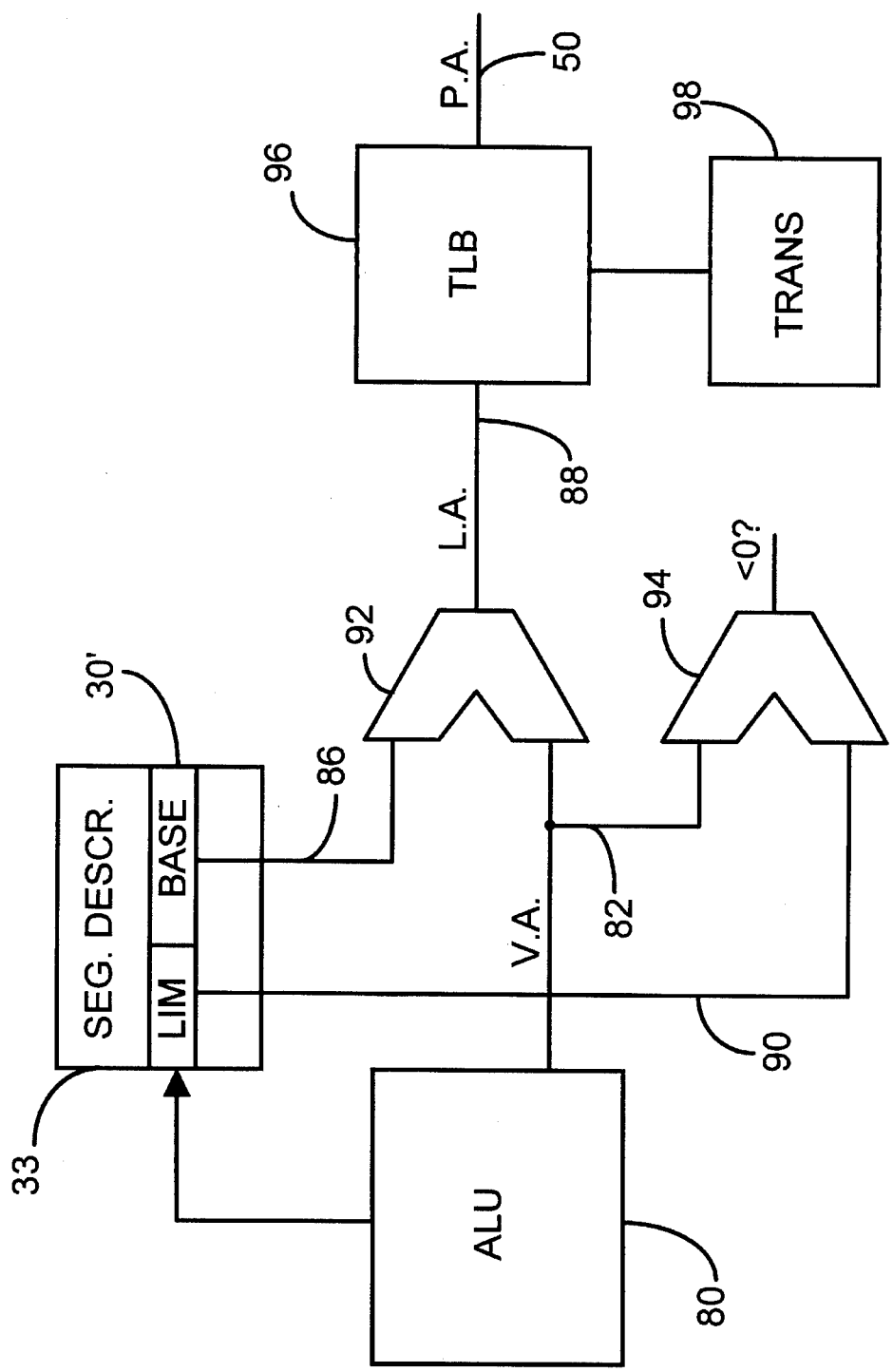
FIG. 3 is a block diagram of a CPU with segmentation and paging.

FIG. 3 is a block diagram of address generation in a typical x86 processor, which includes both segmentation and paging. ALU 80 calculates a virtual address 82 from address components indicated by an instruction being processed. ALU 80 or other decode logic (not shown) indicates which segment is being referenced by the instruction and selects one segment descriptor 30' in a segment descriptor register array 33. The selected segment descriptor 30' includes a base address field which outputs the base or starting address of the selected segment on line 86, and a limit or upper bound which is outputted on line 90. Virtual address 82 is added to the base address 86 in segment adder 92, to produce a linear address 88. The segment adder 92 must be a full 32-bit adder in the x86 architecture because segments can begin and end on any boundary, down to single-byte granularity. Other architectures that restrict the segment to begin and end on page boundaries need not add the lower 12 bits, and thus can use a smaller adder.

Subtractor 94 subtracts the virtual address 82 from the limit on line 90. If a negative value results, then the virtual address exceeds the limit and a segment overrun error is signaled. A second adder/subtractor could be used to check the lower bound of the segment; however if the lower bound is always virtual address 0, then the segment adder 92 can be used for the lower bound check. If the result is a negative number then the lower bound has been violated. Thus the negative flag or the sign bit may be used for lower bound checking. Comparators may also be employed for bounds checking.

Linear address 88 is translated to a physical address by translation-lookaside buffer or TLB 96, which is a small cache of the page translation tables stored in main memory. The TLB 96 translates the upper 20 bits of the linear address by searching the associative TLB cache for a match, and if one is found, then replacing these upper 20 bits with another 20 bits stored in the TLB 96.

If the linear address is not found in the TLB, then a miss is signaled to the translator 98, which accesses the page tables in main memory and loads into the TLB the page table entry that corresponds to the linear address. Future references to the same page will "hit" in the TLB, which will provide the translation. Translator 98 may be implemented entirely in hardware, entirely in software, or in a combination of hardware and software.

SEGMENT DESCRIPTORS

Figure 4:
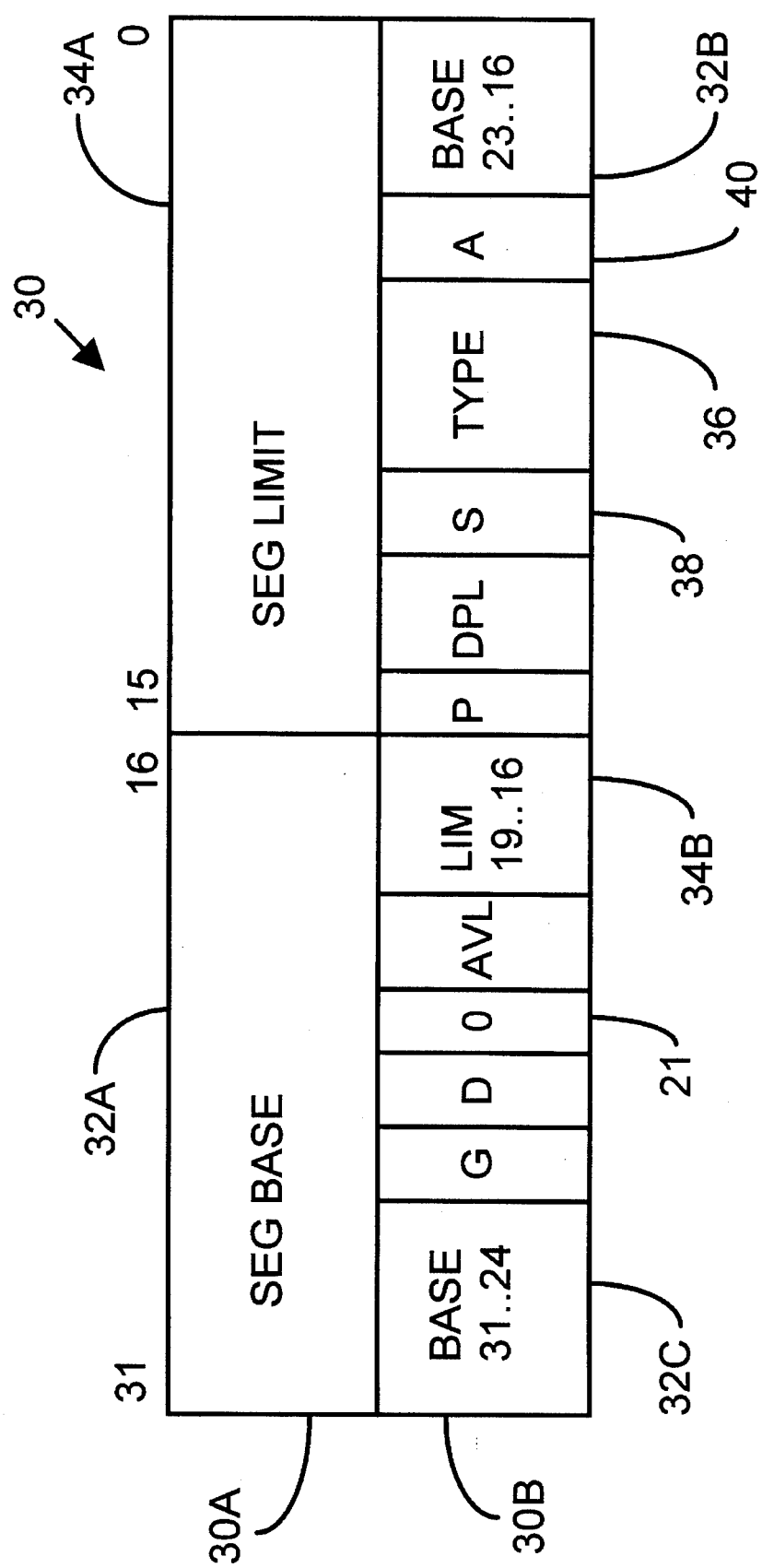
FIG. 4 is a diagram of a CISC segment descriptor.

FIG. 4 is a diagram of a segment descriptor in the x86 architecture. The descriptor 30 consists of two 4-byte double-words 30A and 30B. The beginning address of the segment is determined by the segment base 32, which is split among three fields, a first base field 32A in the first double-word 30A, having bits 15 to 0 of the base address, a second base field 32B in the second double-word 30B, having bits 23 to 16 of the base address, and a third base field 32C in the second double-word, having bits 31 to 24 of the base address. Combining fields 32A, 32B, and 32C yields a 32-bit segment base address. Likewise the upper bound or limit of the segment 34 is broken up among two fields, a first limit field 34A in the first double-word 30A, and a second limit field 34B in the second double-word 30B. Combining fields 34A and 34B yields a 20-bit limit for the segment. The limit 34 is the length or size of the segment.

Many attribute bits are provided to control access to the segment and to further define the segment, or to aid the operating system in management of the segment. The x86 architecture defines the following attribute bits:

| | |
|---|---|
| P | Present bit. 1 = segment is present in memory; 0 = not present in memory |
| DPL | Descriptor Privilege Level 3–0 |
| S | Segment type 1 = User Code/data; 0 = system |
| Type | Segment Type (see below) |
| A | Accessed |
| G | Granularity 1 = page/4K; 0 = byte |
| D | Default Operation Size 1 = bit; 0 = 16 bit |
| AVL | Available for user or O/S, extra bit |

The system field 38 breaks segments into two broad classes: system segments that are used by the operating system, and user segments, such as code, data, and stack segments. The Type field 36 further defines the type of segment pointed to by the descriptor. Some of the other attribute bits may change definition depending upon the segment type. Three bits are used to encode the type, so $2^3$ or 8 types are possible. For user segments, the type bits indicate if the segment is executable, writable, or readable. A code segment would be executable but not writable, while a data segment would be writable but not executable. For system segments, the accessed bit 40 is used as an extra type bit so that the type field is now 4 bits for system segments. The system segment types defined by Intel are shown in Table 1.

TABLE 1

System Segment Types

| Type Code | Segment/gate |
|---|---|
| 0 | Invalid |
| 1 | 286 TSS |
| 2 | LDT |
| 3 | 286 TSS Busy |
| 4 | 286 Call Gate |
| 5 | Task Gate |
| 6 | 286 Interrupt Gate |
| 7 | 286 Trap Gate |
| 8 | Invalid |
| 9 | 486 TSS |
| A | Reserved by Intel |
| B | TSS Busy |
| C | 486 Call Gate |
| D | Reserved by Intel |
| E | 486 Interrupt Gate |
| F | 486 Trap Gate |

GATE DESCRIPTORS

Figure 2:
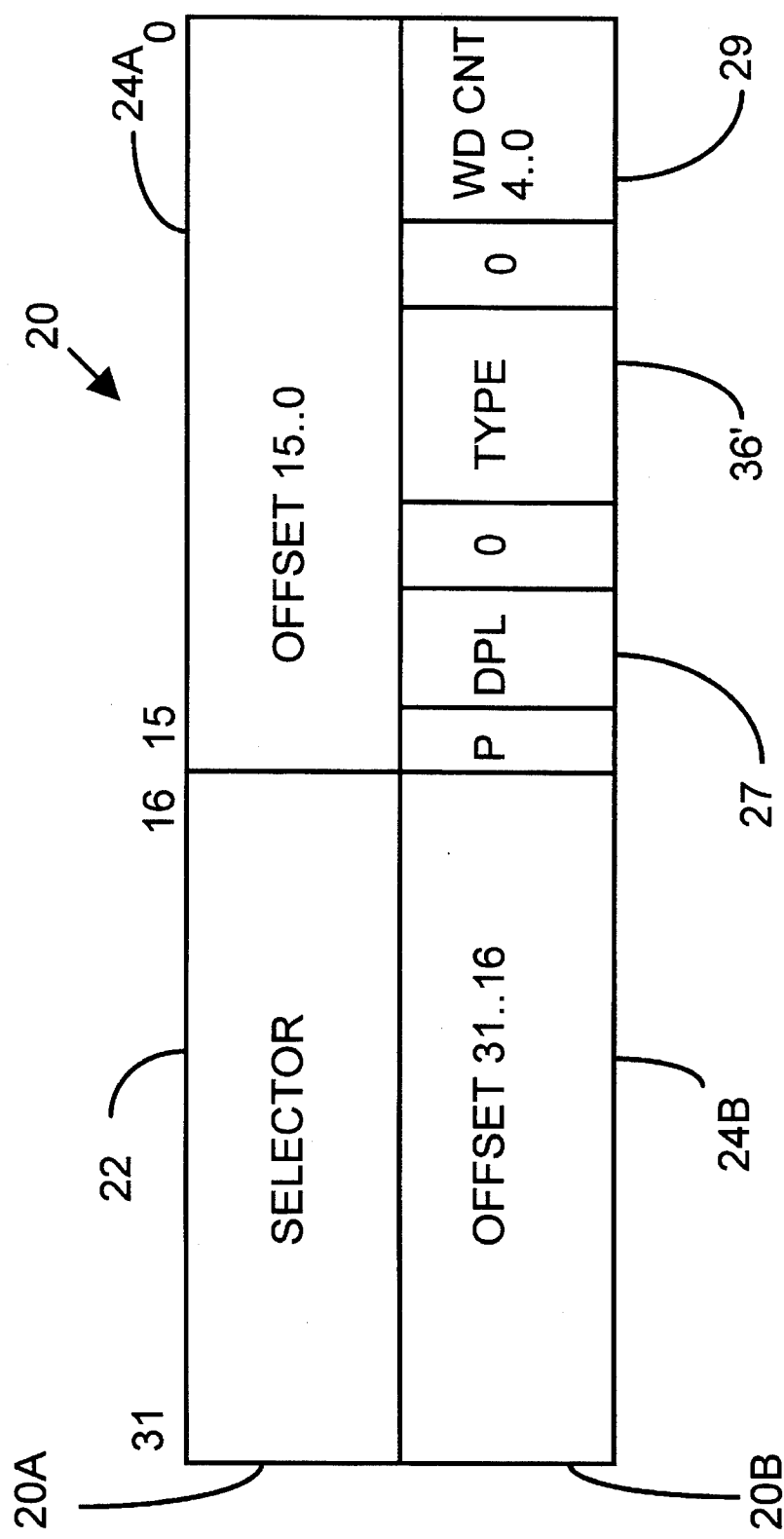
FIG. 2 is a CISC call gate descriptor.

FIG. 2 is a diagram of a gate descriptor in the x86 architecture. Gate descriptors control access to entry points into a code segment. Interrupt gate descriptors are placed in the interrupt descriptor table in protected mode. The gate descriptor 20 consists of two 4-byte double-words 20A and 20B. The beginning address of the service routine within the segment is determined by the offset 24, which is split among two fields, a first offset field 24A in the first double-word 20A, having bits 15 to 0 of the offset address, and a second offset field 24B in the second double-word 20B, having bits 31 to 16 of the offset address. Combining fields 24A and 24B yields a 32-bit offset address within the segment. A selector 22 identifies the segment that is the target of the gate descriptor. The target segment will have its own segment descriptor, such as the descriptor shown in FIG. 4, which must be accessed and checked before code can be fetched from the target segment.

Many attribute bits are provided to define the control transfer gate. The x86 architecture defines the following attribute bits:

| | |
|---|---|
| P | Present bit. 1 = segment is valid; 0 = not valid |
| DPL | Descriptor Privilege Level 3–0 |
| WD CNT | Number of parameters passed to procedure called (call gate only) |
| Type | Segment Type (see Table 1) |

The type of gate can be interrupt, task switch, trap, or call, depending upon the type of control transfer defined by the gate. Table 1 also shows the types of gate descriptors defined for the x86 architecture. The last 4 rows of Table 1 are gate descriptor types while the first four rows of Table 1 are segment descriptor types.

SEGMENT CODE DESCRIPTORS INDICATING INSTRUCTION SET

The x86 segment descriptors may be modified to indicate that the segment descriptor refers to a segment containing RISC code rather than x86 CISC code. An invalid or reserved combination of bits in the segment descriptor can be used to indicate that the processor should switch to decoding RISC code rather than CISC code when accessing code in this segment. Bit 21 in the second double-word of the segment descriptor of FIG. 4 is normally always zero for x86 systems. Setting this bit to one, which could cause a prior-art x86 system to perform an undocumented function, would indicate to a dual-instruction-set processor of the present invention that the segment contains code written in a RISC instruction set rather than the x86 CISC instruction set.

Setting bit 21 to a one is the preferred technique for indicating RISC code within a segment because this bit can be set for any type of segment, system or user. However, other ways of indicating RISC code are also possible. Table 1A showed that four types of system segments were either invalid or reserved for Intel. Setting a descriptor for a system segment to one of these invalid or reserved types could also indicate that the segment contains RISC code.

RISC data structures may differ from x86 data structures. For example, the order of the bytes in a data word can be either "big endian" or "little endian", depending upon whether the most significant bit is in the highest byte or the lowest byte of the data word. Invalid or reserved segment descriptor types could also be used to indicate that a RISC data structure and byte-ordering is to be used when accessing the data in the segment rather than the default CISC byte-ordering.

CISC USER CODE CALLING RISC O/S ROUTINES

Regardless of the reason for a control transfer, when a new segment is accessed the segment descriptor is checked to see if it indicates that the new segment contains RISC code or data. If so, then the processor will use a RISC instruction decoder rather than the CISC instruction decoder when executing instructions from the new segment. Any type of inter-segment transfer of control will force the processor to check the new segment descriptor to determine which instruction set to decode. Operating system calls from user code will cause an inter-segment jump, whether a software or hardware interrupt is used, or if a far jump directly to the address of the service routine is employed. The present invention will operate properly, checking the instruction set for the new segment, as long as the operating system is invoked by an inter-segment control transfer.

Great flexibility is provided by the present invention. The operating system no longer must be written in a single instruction set. An x86 operating system such as DOS™ or Windows™ may be re-written entirely in PowerPC™ RISC code, yet still execute x86 programs. The entire operating system does not have to be converted to RISC code however. Parts of the operating system may be re-written while other parts may be left in the original x86 code. While RISC code may have a higher performance for most functions, some functions may have a higher performance in the CISC code, especially if a complex CISC instruction is able to perform the function efficiently. Thus the operating system may be optimized using either of two instruction sets. Additionally, user applications may also be written in either or both instruction sets.

PROTECTION MECHANISMS

The segment descriptors are stored in memory in tables. For the x86 architecture, a global descriptor table contains segment descriptors that are available to all tasks and users in a system. Each task or user will generally have its own local descriptor table storing segment descriptors for its own segments. Thus one user's segments are protected from another user because his segment descriptors are stored in his own local table. System descriptors are located in the global table, while user code, data, and stack segment descriptors are usually located in a user's local descriptor table. The interrupt table is usually shared by all users, and its entries are similar to segment descriptors. Rather than storing a segment base address and a limit, the interrupt descriptors contain an identifier to select a new segment, and an offset to specify a starting address to jump to within that segment.

Using the present invention, RISC code can reside within a CISC segment. The CISC architecture is extended to provide for segments that can hold RISC code rather than just CISC code. These new RISC code segments have descriptors that are almost identical to the CISC segment descriptors, and therefore these RISC descriptors may reside in the CISC descriptor tables. The global descriptor table in particular may have CISC code segment descriptors for parts of the operating system that are written in x86 CISC code, while also having RISC code segment descriptors for the parts of the operating system that are written in RISC code.

When control is passed to a new code segment, the segment descriptor is fetched from the global or local descriptor table, and protection checks are performed as usual. The present bit stored in the segment descriptor is examined, and an error is signalled if the segment is not present in memory. The type of the segment is checked, and an error is signalled if the segment is not a code segment. The privilege level in the descriptor is examined and a segment error is signaled if the privlege rules are violated. These protection checks are done without regard to the type of code residing in the segment, be it RISC or CISC.

Figure 5:
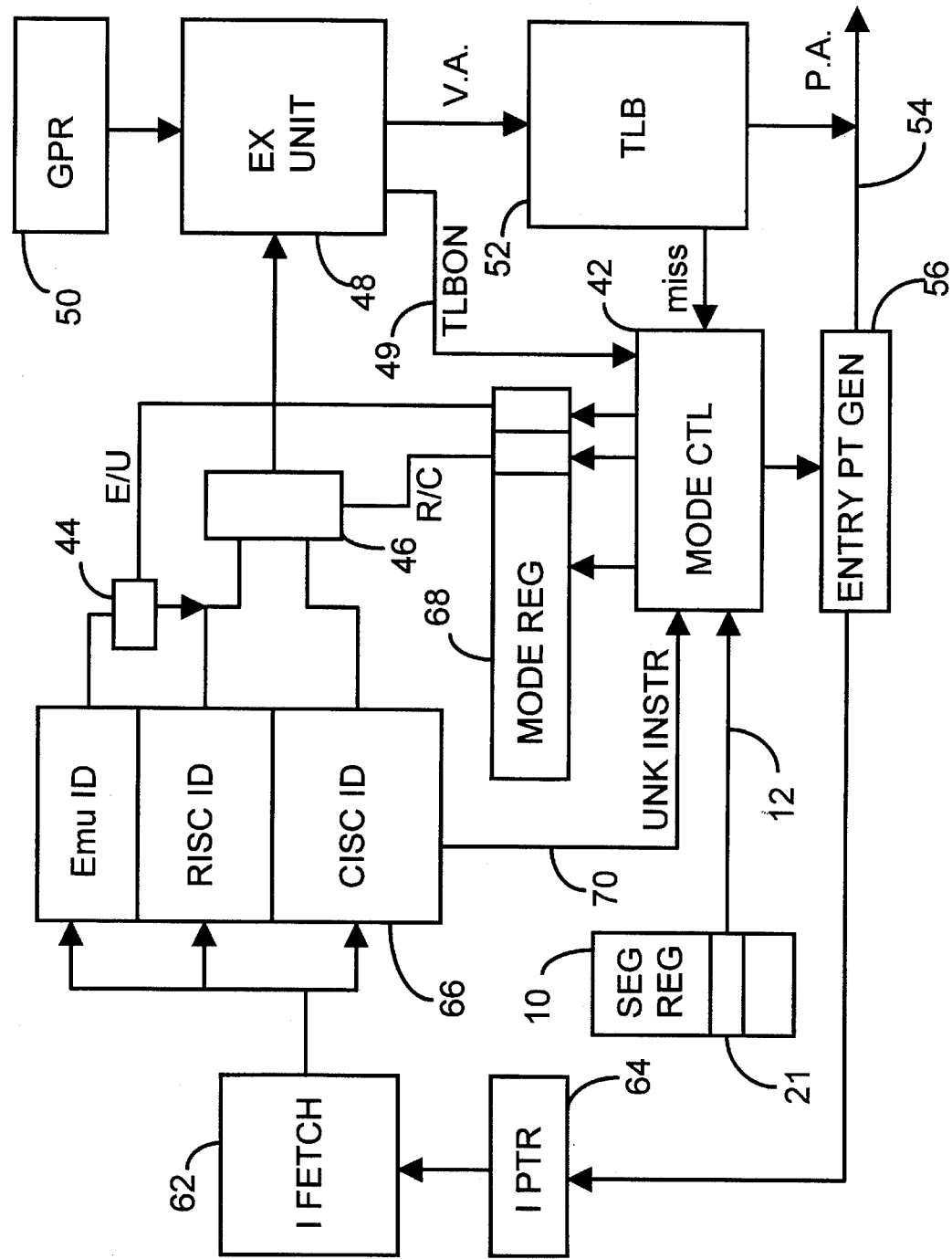
FIG. 5 is a block diagram of a dual-instruction-set CPU.

Referring to FIG. 5, if the protection checks pass, then control is transferred to the new segment by loading the new segment base address into the processor's code segment register 10, and fetching the next instruction from the address pointed to by the instruction pointer 64 (IP). Before this instruction is decoded, the segment register 10 is also loaded with the instruction set type bit 21, from the segment descriptor. If the instruction set type bit 21 indicates that RISC code is to be decoded, then the RISC instruction decode unit is enabled and its output selected by mux 46 to be sent to the execute unit 48. If the instruction set type bit 21 indicates that CISC code is to be decoded, then the CISC instruction decode unit is enabled and its output selected by mux 46 to be sent to the execute unit 48. Mode control 42 copies the instruction set type bit 21 from line 12 to the RISC/CISC bit in mode register 68.

CPU HARDWARE

The next pages provide further background on the processor hardware used to implement a dual-instruction set processor. The present application is a Continuation-in-Part of the parent copending application for a "Dual-Instruction-Set Architecture CPU with Hidden Software Emulation Mode", filed Jan. 11, 1994, U.S. Ser. No. 08/179,926, having a common inventor and assigned to the same assignee as the present application.

FIG. 5 shows a simplified block diagram of a CPU that can execute both RISC and CISC instructions. Instruction Pointer 64 indicates the instruction to be decoded in instruction fetch unit 62. This instruction is sent to Instruction Decode (ID) 66. Instruction decode 66 is composed of three sub-blocks, one for decoding CISC instructions, another for decoding RISC instructions, and a third sub-block for decoding extended RISC instructions for emulation mode. The extended instructions are at the highest privilege level, higher than even the operating systems that may be running under RISC of CISC modes. These extended instructions offer access to all the system resources, including mode register 68. Mode register 68 contains bits to indicate the current operating mode of the CPU. One bit selects between the RISC and CISC user modes, while another bit enables the extended RISC instructions for emulation mode.

Instruction decode 66 is a partial instruction decode unit, in that it fully decodes only about 50% of the x86 CISC instructions, and about 85% of the PowerPC™ RISC instructions. Several well-known implementations are possible for instruction decode 66. For example, random logic may be used to decode the instruction set defined by an opcode map such as Tables 2 and 3. Opcode maps in Tables 2 and 3 are similar to logic truth tables in that they fully specify the logic equations needed to decode the instruction set. Instructions that are not fully decoded are not directly supported by hardware, and signal an "unknown opcode" on line 70 to mode control 42, which causes emulation mode to be entered.

The same opcode may map to different operations or instructions in the two instruction sets, requiring separate decode units for each instruction set. Since emulation code runs a superset of the RISC code, additional logic to decode these extended instructions is provided with the RISC decode block. The extended emulation mode instructions are enabled by enable block 44, which is controlled by the emulation mode bit in the mode register 68. Multiplexer or Mux 46 selects the decoded instruction from either the RISC or the CISC decode sub-block. Mux 46 is controlled by the RISC/CISC mode control bit in mode register 68. When emulation mode is entered, the RISC/CISC bit must be set to the RISC setting and the emulation mode bit enabled, because RISC instructions may also be executed by the emulation code.

The decoded instruction is passed from mux 46 to execute unit 48, which can perform arithmetic functions and address generation. General-purpose registers 50 supply operands to the execute unit 48. Since a full segmentation unit is not provided, segment addition must be performed by the execute unit when needed as part of normal address generation. Limit checking is provided by hardware associated with the TLB in conjunction with the emulation driver.

Execute unit 48 is designed to execute the simpler CISC and RISC instructions, and thus has reduced complexity relative to traditional execute units on CISC and even RISC CPU's. Since only simple instructions are directly supported, the unit can be made to operate at higher speed than if all instructions were supported. Microcode can be minimized or even eliminated because complex instructions are supported by algorithms stored in emulation memory. These algorithms are not merely microcode stored off chip, which would require much more memory, but are higher-level routines composed of RISC instructions and extended instructions.

Any address generated by execute unit 48 is sent to the TLB 52, which performs an associative search on the input virtual address and translates it to a physical address output on bus 54. The page or upper address is from the TLB and the offset or lower address is bypassed around the TLB. TLB 52 can translate virtual addresses from the execute unit 48 to physical addresses if segmentation is disabled, or translate a linear address generated by addition in the address generation unit to a physical address. If the segment begins or ends on a page, then special hardware is required to specify that emulation mode should be entered if the address is close to the segment boundary, or within the physical page but outside the segment.

If the translation is not present in the TLB, a miss is signaled which causes emulation mode to be entered. Emulation mode is always used to load the TLB, allowing the emulation driver the highest level of control over address mapping and translation. Mode control 42 causes emulation mode to be entered whenever a miss is signaled from TLB 52, or an unknown opcode is detected by instruction decode 66. Normal exceptions, interrupts, and traps from the execute unit and other units also cause emulation mode to be entered, giving great flexibility in system design. Mode control 42 sets and clears the RISC/CISC and emulation mode control bits in mode register 68. When entry to emulation mode is requested, entry point block 56 generates the proper entry point vector or address in the emulation portion of memory, and loads this address into the instruction pointer 64. Thus the CPU will begin fetching and executing instructions at the specified entry point, where the emulation driver contains a routine to handle the exception, TLB miss, or to emulate the unknown instruction. Instruction decode 66 can provide the opcode itself and other fields of the instruction to the entry point logic, to allow the entry point to be more fully specified. Thus one entry point could be defined for a REP MOVS with a byte operand while another entry point is defined for a REP MOVS instruction with a long-word operand. Table 2 shows the entry points from CISC mode. For example, the REP MOVS byte instruction enters the emulation code at A4 hex, while REP MOVS longword enters at A5 hex. A TLB miss with segment 0 enters at 18 hex, while a far RETurn in x86 real mode enters at CA hex.

If the CISC user program executes an instruction to enable or disable translation and the TLB, the instruction may be detected by the instruction decode 66, causing an unknown instruction to be signaled over line 70 to mode control 42, causing emulation mode to be entered. Execute unit 48 may also detect an attempt to enable or disable the TLB, and signal mode control 42 by asserting TLB enable detect 49. TLB enable detect 49 does not enable or disable the TLB as is does for a prior-art CISC CPU; instead it causes emulation mode to be entered, which will emulate the effect the instruction would have had. However, the TLB is not disabled. Thus emulation mode has complete control over the TLB.

RISC INSTRUCTION DECODE

The RISC sub-block of instruction decode 66 decodes the PowerPC™ RISC instruction set. All instructions are 32 bits in size, and some require two levels of instruction decoding. The first level determines the basic type of instruction and is encoded in the 6 most significant bits. Table 3 shows the 64 possible basic or primary opcode types. For example, 001110 binary (0E hex) is ADDI—add with an immediate operand, while 100100 (24 hex) is STW—store word. The CPU executes the 45 unshaded opcodes directly in hardware. The fifteen darkly shaded opcodes, such as 000000, are currently undefined by the PowerPC™ architecture. Undefined opcodes force the CPU into emulation mode, where the emulation driver executes the appropriate error routine. Should instructions later be defined for these opcodes, an emulator routine to support the functionality of the instruction could be written and added to the emulator code. Thus the CPU may be upgraded to support future enhancements to the PowerPC™ instruction set. It is possible that the CPU could be field-upgradable by copying into emulation memory a diskette having the new emulation routine.

The second level of instruction decoding is necessary for the remaining four lightly shaded opcodes of Table 3. Another 12-bit field in the instruction word provides the extended opcode. Thus one primary opcode could support up to 4096 extended opcodes. Primary opcode 010011, labeled "GRP A" in Table 3, contains instructions which operate on the condition code register, while groups C and D (opcodes 111011 and 111111 respectively) contain floating point operations. Group B (opcode 011111) contains an additional version of most of the primary opcode instructions, but without the displacement or immediate operand fields. Most group B and many instructions from groups A, C, and D are directly supported by the CPU's hardware, and the RISC instruction decoder thus supports some decoding of the 12-bit second level field. In the appendix is a list of the PowerPC™ instruction set, showing the primary and extended opcodes, and if the instruction is supported directly in hardware or emulated in emulation mode, as is, for example, opcode 2E, load multiple word.

EXTENDED INSTRUCTIONS FOR EMULATION MODE

Extended instructions for controlling the CPU's hardware are added to the RISC instruction set by using undefined opcodes, such as those indicated by the darkly shaded boxes in Table 3. Thus additional logic may be added to the RISC instruction decode unit to support these additional instructions. However, user RISC programs must not be allowed to use these extended instructions. Therefore, the decoding of these extended instructions can be disabled for RISC user mode, and only enabled for emulation mode.

Extended instructions include instructions to control the translation-lookaside buffer or TLB. The TLB may only be loaded or modified by these extended instructions which are only available when in emulation mode. Thus the emulation mode drivers have complete control over address mapping and translation in the system. This allows the emulation driver to set aside an area of memory for its own use, and to prevent user programs from accessing or modifying this area of memory. Because all memory references in user modes are routed through the TLB, which is only controllable by the emulation mode driver, the emulation mode acts as an additional layer of software between the user mode programs and operating systems, and the actual system memory and I/O. Thus the emulation driver can create an area of memory hidden from the user mode programs, and can locate its drivers and emulation routines in this hidden area of memory.

CISC INSTRUCTION DECODE

CISC instructions can range in size from 8 bits (one byte) to 15 bytes. The primary x86 opcode, is decoded by the instruction decode 66 of FIG. 5. About 50% of the x86 instructions that can be executed by Intel's 80386 CPU are executed directly by the dual-instruction set CPU. Table 4 shows a primary opcode decode map for the x86 instruction set. Unshaded opcodes are directly supported in hardware, such as 03 hex, ADD r,v for a long operand. This same opcode, 03 hex, corresponds to a completely different instruction in the RISC instruction set. In CISC 03 hex is an addition operation, while in RISC 03 hex is TWI—trap word immediate, a control transfer instruction. Thus two separate decode blocks are necessary for the two separate instruction sets.

A comparison of the opcode decoding of Table 3 for the RISC instruction set with Table 4 for the CISC instruction set shows that the two sets have independent encoding of operations to opcodes. While both sets have ADD operations, the binary opcode number which encodes the ADD operation is different for the two instruction sets. In fact, the size and location of the opcode field in the instruction word is also different for the two instruction sets.

Darkly shaded opcodes in Table 4 are not supported directly by hardware and cause an unknown or unsupported opcode to be signaled over line 70 of FIG. 5. This causes emulation mode to be entered, and the opcode is used to select the proper entry point in the emulation memory. By careful coding of the emulation routine, performance degradation can be kept to a minimum. Lightly shaded opcodes in Table 4 are normally supported directly by the CPU, but not when preceded by a repeat prefix (opcode F2 or F3).

ALTERNATE EMBODIMENTS

Several other embodiments are contemplated by the inventors. For example, while the preferred embodiment has been described as having two instruction sets, multiple instruction sets could be decoded and defined in the segment descriptors. The present invention is not limited to x86 CISC and PowerPC™ RISC instruction sets, but may be extended to instruction sets other than x86 and PowerPC™ and other types of instruction sets besides RISC and CISC. While the present invention has been described using a preferred embodiment where a user program written in CISC code makes a call to an operating system in RISC code, the call from the user program could also be to another part of the user program that is written in RISC code. Thus a large user application could make use of the present invention by having some parts written in CISC code while other parts are written in RISC code. The parts written in RISC code might be speed-critical portions of the large user application.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 2

CISC Entry Points

| | x0 | x1 | x2 | x3 | x4 | x5 | x6 | x7 | x8 | x9 | xA | xB | xC | xD | xE | xF |
|---|---|---|---|---|---|---|---|---|---|---|---|---|---|---|---|---|
| 0x | Undefined | GRP7 | LAR | LSL | CLTS | | PUSH ES | POP ES real | ZOT 0 | ZOT 1 | ZOT 2 | ZOT 3 | ZOT 4 | ZOT 5 | ZOT 6 | ZOT mult. |
| 1x | GRP6 | | | | | | PUSH SS | POP SS | mis 0 | mis 1 | mis 2 | mis 3 | mis 4 | mis 5 | TLB miss none | POP DS real |
| 2x | MOV c,r | MOV d,r | MOV r,c | MOV r,d | MOV t,r | | MOV r,t | DAA | TLB inval 0 | TLB inval 1 | TLB inval 2 | TLB inval 3 | TLB inval 4 | TLB inval 5 | PUSH CS | DAS |
| 3x | | | | | | | | AAA | ZOT inst | | | | | | | AAS |
| 4x | reset | NMI | INTR | | | | | | TLB miss inst | | | | | | | |
| 5x | | | | | | | | POP ES prot | DIV0 OFLO W | | | | | | | POP DS prot |
| 6x | PUSH A | POPA | BOU ND | ARPL | | | | POP SS prot | | | | | | | | |
| 7x 8x | | | | | | | | | | | | | | | | |
| 9x | | | | | SHLD | SHLD | | | INVD C | WBIN V | RSM | | SHR D | SHR D | | |
| Ax | PUSH FS | POP FS | | | LFS | LGS | LFS | LGS | | | Call far | Call far prot | PUSH F 16bit Lods | POPF | PUSH F 32bit Scas | POP F 32bit Scas |
| Bx | | real POP FS | LSS | | real Movs | real Movs | prot Cmps | prot Cmps | PUSH GS | POP GS | real Stos | real Stos | 16bit Lods | 16bit Lods | byte REP Scas | long REP Scas |
| Cx | XAD D | prot XAD D | LSS real | LSS prot | byte REP Movs | byte REP Movs | byte REP Cmps | long REP Cmps | | real POP GS | byte REP Stos | long REP Stos | byte REP Lods | long REP Lods | byte REP Scas | long REP Scas |
| Dx | | | | | byte repne LES | byte repne LDS | byte repne LES | long repne LDS | Enter | prot Leave | byte repne RET far | long repne RET far | PUSH F | long repne INTn | byte repne INTO | long repne IRET |
| Ex | | | | | real AAM | real AAD | prot | prot XLAT | | | real RET far | real RET far | real INT3 | real INTn | real INTO | real IRET |
| Fx | | | | | IN | IN | OUT | OUT | | | prot JMP far | prot JMP far | prot IN | prot IN | prot OUT | prot OUT |
| | | | | | HLT | | CMP XCH | CMP XCH | | | real CLI | real STI | BSF | BSR | | all other |

TABLE 2-continued

| | | | | | | | CISC Entry Points | | | | | | | | |
|---|---|---|---|---|---|---|---|---|---|---|---|---|---|---|---|
| x0 | x1 | x2 | x3 | x4 | x5 | x6 | x7 | x8 | x9 | xA | xB | xC | xD | xE | xF |
| | | | | | | G | G | | | | | | | | invals |

TABLE 3

PowerPC™ RISC Opcodes

| PowerPC primary opcode | XXX000 | XXX001 | XXX010 | XXX011 | XXX100 | XXX101 | XXX110 | XXX111 |
|---|---|---|---|---|---|---|---|---|
| 000XXX | | | | TWI | | | | MULI |
| 001XXX | SUBFIC | | CMPLI | CMPI | ADDIC | ADDIC. | ADDI. | ADDIS |
| 010XXX | BCx | SC | Bx | GRP A Condition register instructions | RLWIMIX | RLWINMx | | RLWNMx |
| 011XXX | ORI | ORIS | XORI | XORIS | ANDI. | ANDIS. | | GRP B Misc. Instructions |
| 100XXX | LWZ | LWZU | LBZ | LBZU | STW | STWU | STB | STBU |
| 101XXX | LHZ | LHZU | LHA | LHAU | STH | STHU | LMW | STMW |
| 110XXX | LFS | LFSU | LFD | LFDU | STFS | STFSU | STFD | STFDU |
| 111XXX | | | | GRP C FP operate | | | | GRP D FP operate |

TABLE 4 x86 CISC Opcode Map

| OP | x0 | x1 | x2 | x3 | x4 | x5 | x6 | x7 | x8 | x9 | xA | xB | xC | xD | xE | xF |
|---|---|---|---|---|---|---|---|---|---|---|---|---|---|---|---|---|
| 0x | ADD v,r byte | ADD v,r long | ADD r,v byte | ADD r,v long | ADD AL,i | ADD AX,i | PUSH ES | POP ES | OR v,r byte | OR v,r long | OR r,v byte | OR r,v long | OR AL,i | OR AX,i | PUSH CS | 2nd Page |
| 1x | ADC v,r byte | ADC v,r long | ADC r,v byte | ADC r,v long | ADC AL,i | ADC AX,i | PUSH SS | SS | SBB byte | SBB long | SBB byte | SBB long | SBB AL,i | SBB AX,i | PUSH DS | POP DS |
| 2x | AND v,r byte | AND v,r long | AND r,v byte | AND r,v long | AND AL,i | AND AX,i | ES | DAA | SUB v,r byte | SUB v,r long | SUB r,v byte | SUB r,v long | SUB AL,i | SUB AX,i | SEG CS | DAS |
| 3x | XOR v,r byte | XOR v,r long | XOR r,v byte | XOR r,v long | XOR AL,i | XOR AX,i | SEG SS | AAA | CMP v,r byte | CMP v,r long | CMP r,v byte | CMP r,v long | CMP AL,i | CMP AX,i | SEG DS | AAS |
| 4x | INC AX | INC CX | INC DX | INC BX | INC SP | INC BP | INC SI | INC DI | DEC AX | DEC CX | DEC DX | DEC BX | DEC SP | DEC BP | DEC SI | DEC DI |
| 5x | PUSH AX | PUSH CX | PUSH DX | PUSH BX | PUSH SP | PUSH BP | PUSH SI | PUSH DI | POP AX | POP CX | POP DX | POP BX | POP SP | POP BP | POP SI | POP DI |
| 6x | PUSH A | POPA | BOUND | ARPL | SEG FS | SEG GS | OP SIZE | ADR SIZE | PUSH long | IMUL long | PUSH byte | IMUL byte | INS | INS | OUTS | OUTS |
| 7x 8x | JO | JNO | JB | JNB | JZ | JNZ | JBE | JNBE | JS | JNS | JP | JNP | JL | JNL | JLE | JNLE |
|  | ALU v,i byte | ALU v,i long | ALU v,i 16bit | ALU v,i signext | TEST v,r byte | TEST v,r long | v,r byte | v,r long | MOV v,r byte | MOV v,r long | MOV r,v byte | MOV r,v long | MOV v,s 16bit | LEA | MOV s,v 16bit | POP v |
| 9x | NOP | Xchg CX | Xchg DX | Xchg BX | Xchg SP | Xchg BP | Xchg SI | Xchg DI | CBW | CWD | Call | WAIT | PUSH F | POPF | SAHF | LAHF |
| Ax | MOV AL,m | MOV AX,m | MOV m,AL | MOV m,AX | Movs byte | Movs long | Cmps byte | Cmps long | TEST AL,i | TEST AX,i | Stos byte | Stos long | Lods byte | Lods long | Scas byte | Scas long |
| Bx | MOV AL,i | MOV CL,i | MOV DL,i | MOV BL,i | MOV AH,i | MOV CH,i | MOV DH,i | MOV BH,i | MOV AX,i | MOV CX,i | MOV DX,i | MOV BX,i | MOV SP,i | MOV BP,i | MOV SI,i | MOV DI,i |
| Cx | SHFT v,i byte | SHFT v,i long | RET 16bit | SHIFT v,CL long | LES | LDS | MOV v,i byte | MOV v,i long | Enter | Leave | RET | RET | INT3 | INTa | INTO | IRET |
| Dx | SHFT v,i byte | SHFT v,i long | SHFT v,CL byte | SHFT v,CL long | AAM | AAD | | XLAT | FP | FP | FP | FP | FP | FP | FP | FP |
| Ex | Loop NE | Loop E | Loop | JCXZ | IN | IN | OUT | OUT | Call long | JMP long | JMP | JMP byte | IN | IN | OUT | OUT |
| Fx | Lock | | REP NE | REP | HLT | CMC | ALU2 v byte | ALU2 v long | CLC | STC | CLI | STI | CLD | STD | GRP4 | GRP5 |

Appendix

PowerPC ™ RISC Instruction Set

| Primary opcode | Extend. opcode | Mnemonic | Instruction | How handled | Units |
|---|---|---|---|---|---|
| 20 | | lwz | Load word and zero | Hardware | IU0 |
| 21 | | lwzu | update | | IU01 |
| 1F | 17 | lwzx | indexed | | IU0 |
| 1F | 37 | lwzux | indexed update | | IU01 |
| 24 | | stw | Store word | Hardware | IU0 |
| 25 | | stwu | update | | IU01 |
| 1F | 97 | stwx | indexed | | IU0 |
| 1F | B7 | stwux | indexed update | | IU01 |
| 28 | | lhz | Load halfword and zero | Hardware | IU0 |
| 29 | | lhzu | update | | IU01 |
| 1F | 117 | lhzx | indexed | | IU0 |
| 1F | 137 | lhzux | indexed update | | IU01 |
| 2A | | lha | Load halfword algebraic | | IU0 |
| 2B | | lhau | update | | IU01 |
| 1F | 157 | lhax | indexed | | IU0 |
| 1F | 177 | lhaux | indexed update | | IU01 |
| 2C | | sth | Store halfword | Hardware | IU0 |
| 2D | | sthu | update | | IU01 |
| 1F | 197 | sthx | indexed | | IU0 |
| 1F | 1B7 | sthux | indexed update | | IU01 |
| 22 | | lbz | Load byte and zero | Hardware | IU0 |
| 23 | | lbzu | update | | IU01 |
| 1F | 57 | lbzx | indexed | | IU0 |
| 1F | 77 | lbzux | indexed update | | IU01 |
| 26 | | stb | Store byte | Hardware | IU0 |
| 27 | | stbu | update | | IU01 |
| 1F | D7 | stbx | indexed | | IU0 |
| 1F | F7 | stbux | indexed update | | IU01 |
| 30 | | lfs | Load F.P. single | Hardware | IU0 |
| 31 | | lfsu | precision | | IU01 |
| 1F | 217 | lfsx | update | | IU0 |
| 1F | 237 | lfsux | indexed | | IU01 |
| | | | indexed update | | |
| 32 | | lfd | Load F.P. double | Hardware | IU0 |
| 33 | | lfdu | precision | | IU01 |
| 1F | 257 | lfdx | update | | IU0 |
| 1F | 277 | lfdux | indexed | | IU01 |
| | | | indexed update | | |
| 34 | | stfs | Store F.P. single | Hardware | IU0 |
| 35 | | stfsu | precision | | IU01 |
| 1F | 297 | stfsx | update | | IU0 |
| 1F | 2B7 | stfsux | indexed | | IU01 |
| | | | indexed update | | |
| 36 | | stfd | Store F.P. double | Hardware | IU0 |
| 37 | | stfdu | precision | | IU01 |
| 1F | 2D7 | stfdx | update | | IU0 |
| 1F | 2F7 | stfdux | indexed | | IU01 |
| | | | indexed update | | |
| 2E | | lmw | Load multiple word | Emulate | IU01 & BU |
| 2F | | stmw | Store multiple word | Emulate | IU01 & BU |
| 1F | 216 | lwbrx | Load word byte-reverse indexed | Hardware | IU0 |
| 1F | 296 | stwbrx | Store word byte-reverse indexed | Hardware | IU0 |
| 1F | 316 | lhbrx | Load halfword byte-reverse indexed | Hardware | IU0 |
| 1F | 396 | sthbrx | Store halfword byte-reverse indexed | Hardware | IU0 |
| 1F | 14 | lwarx | Load word and reserve indexed | | IU0 |
| 1F | 96 | stwcx. | Store word conditional indexed | | IU0 |

| Primary opcode | Extend. opcode | Mnemonic | 1F | How handled | Units |
|---|---|---|---|---|---|
| Logical and Shift Instructions | | | | | |
| 1F | 1C | andx | AND | Hardware | IU1 |
| 1C | | andi. | | | |

Appendix-continued

PowerPC ™ RISC Instruction Set

| Primary opcode | Extend. opcode | Mnemonic | Instruction | How handled | Units |
|---|---|---|---|---|---|
| 1D | | andis. | | | |
| 1F | 3C | andcx | AND with complement | Hardware | IU1 |
| 1F | 7C | norx | NOR | Hareware | IU1 |
| 1F | 11C | eqvx | Equivalent | Hardware | IU1 |
| 1F | 13C | xorx | XOR | Hardware | IU1 |
| 1A | | xori | | | |
| 1B | | xoris | | | |
| 1F | 19C | orcx | OR with complement | Hardware | IU1 |
| 1F | 1BC | orx | OR | Hardware | IU1 |
| 18 | | ori | | | |
| 19 | | oris | | | |
| 1F | 1DC | nandx | NAND | Hardware | IU1 |
| 14 | | rlwimix | Rotate left word immed. then AND with mask insert | Hardware | IU1 |
| 15 | | rlwinmx | Rotate left word immed. then AND with mask | Hardware | IU1 |
| 17 | | rlwnmx | Rotate left word then AND with mask | Hardware | IU1 |
| 1F | 18 | slwx | Shift left word | Hardware | IU1 |
| 1F | 218 | srwx | Shift right word | Hardware | IU1 |
| 1F | 318 | srawx | Shift right algebraic word | Hardware | IU1 |
| 1F | 338 | srawix | Shift right algebraic word immediate | Hardware | IU1 |
| 1F | 1A | cntlzwx | Count leading zeros word | Hardware | IU1 |
| 1F | 39A | extshx | Extend sign halfword | Hardware | IU1 |
| 1F | 3BA | extsbx | Extend sign byte | Hardware | IU1 |

| Primary opcode | Extend. opcode | Mnemonic | Instruction | How handled | Units |
|---|---|---|---|---|---|
| | | | Algebraic instructions | | |
| E | | addi. | ADD immediate | Hardware | IU1 |
| C | | addic | carrying | | |
| D | | addic. | carrying record | | |
| F | | addis | shifted | | |
| 1F | 10A | addx | ADD | Hardware | IU1 |
| 1F | A | addcx | carrying | | |
| 1F | 8A | addex | extended | | |
| 1F | CA | addmex | to minus one extended | | |
| 1F | EA | addzex | to zero extended | | |
| 8 | | subfic | SUB immediate carrying | Hardware | IU1 |
| 1F | 28 | subfx | SUB | Hardware | IU1 |
| 1F | 8 | subfcx | carrying | | |
| 1F | 88 | subfex | extended | | |
| 1F | E8 | subfmex | to minus one extended | | |
| 1F | C8 | subfzex | to zero extended | | |
| 1F | 68 | negx | Negate | Hardware | IU1 |
| B | | cmpi | Compare immediate | Hardware | IU1 |
| A | | cmpli | logical | | |
| 1F | 0 | cmp | Compare | Hardware | IU1 |
| 1F | 20 | cmpl | logical | | |
| | | | Control transfer instructions | | |
| 12 | | bx | Branch | Hardware | BU |
| 10 | | bcx | Branch conditional | Hareware | BU |
| 1F | 4 | tw | Trap word | Hardware | IU1 |
| 3 | | twi | immediate | | |
| 13 | 10 | bcctrx | Branch cond. to count reg. | Hardware | BU |
| 13 | 210 | bclrx | Branch cond. to link reg. | Hardware | BU |
| 11 | 1 | | System call | Hardware | BU |
| | | | Multiply and Divide instructions | | |
| 1F | EB | mullx | Multiply low | Hardware | IU01 |
| 7 | | mulli | immediate | | |
| 1F | 4B | mulhwx | Multiply high | Hardware | IU01 |
| 1F | B | mulhwux | unsigned | | |
| 1F | 1CB | divwx | Divide word | Hardware | IU01 |
| 1F | 1EB | divwux | unsigned | | |
| | | | String instructions | | |
| 1F | 215 | lswx | Load string word indexed | Emulated | IU01 & BU |

Appendix-continued

PowerPC ™ RISC Instruction Set

| | | | | | |
|---|---|---|---|---|---|
| 1F | 255 | lswi | Load string word immediate | Emulated | IU01 & BU |
| 1F | 295 | stswx | Store string word indexed | Emulated | IU01 & BU |
| 1F | 2D5 | stswi | Store string word immediate | Emulated | IU01 & BU |

Condition register instructions

| | | | | | |
|---|---|---|---|---|---|
| 13 | 0 | mcrf | Move CR field | Hardware | BU |
| 13 | 21 | crnor | CR NOR | Hardware | BU |
| 13 | 81 | crandc | CR AND with complement | Hardware | BU |
| 13 | C1 | crxor | CR XOR | Hardware | BU |
| 13 | E1 | crnand | CR NAND | Hardware | BU |
| 13 | 101 | crand | CR AND | Hardware | BU |
| 13 | 121 | creqv | CR Equivalent | Hardware | BU |
| 13 | 1A1 | crorc | CR OR with complement | Hardware | BU |
| 13 | 1C1 | cror | CR OR | Hardware | BU |
| 1F | 90 | mtcrf | Move to CR fields | Hardware | IU1 & BU |
| 1F | 200 | mcrxr | Move to CR from XER | Hardware | BU |
| 3F | 40 | mcrfs | Move to CR from FPSCR | Hardware | BU |
| 1F | 13 | mfcr | Move form CR field | Hardware | IU1 & BU |
| 3F | 26 | mtfsb1x | Move to FPSCR bit 1 | Hardware | BU |
| 3F | 46 | mtfsb0x | Move to FPSCR bit 0 | Hardware | BU |
| 3F | 86 | mtfsfix | Move to FPSCR immediate | Hardware | BU |
| 3F | 247 | mffsx | Move from FPSCR | Hardware | FU & BU |
| 3F | 2C7 | mtfsfx | Move to FPSCR | Hardware | FU & BU |

Privileged instructions

| | | | | | |
|---|---|---|---|---|---|
| 13 | 32 | rfi | Return from interrupt | Emulated | IU01 & BU |
| 13 | 96 | isync | Instruction synchronize | Emulated | IU01 & BU |
| 1F | D2 | mtsr | Move to segment register | Emulated | IU01 & BU |
| 1F | F2 | mtsrin | indirect | | |
| 1F | 253 | mfsr | Move from segment register indirect | Emulated | IU01 & BU |
| 1F | 293 | mfsrin | | | |
| 1F | 53 | mfmsr | Move from machine state register | Emulated | IU01 & BU |
| 1F | 92 | mtmsr | Move to machine state register | Emulated | IU01 & BU |
| 1F | 132 | tlbie | TLB invalidate entry | Emulated | IU01 & BU |
| 1F | 1F2 | slbia | SLB invalidate all | not impl. | IU01 & BU |
| 1F | 1B2 | slbia | SLB invalidate entry | not impl. | IU01 & BU |
| 1F | 1D2 | slbiex | SLB invalidate by index | not impl. | IU01 & BU |
| 1F | 113 | mftb | Move from time base | not impl. | IU01 & BU |
| 1F | 133 | mftbu | Move from time base upper | not impl. | IU01 & BU |
| 1F | 193 | mttb | Move to time base | not impl. | IU01 & BU |
| 1F | 1B3 | mttbu | Move to time base upper | not impl. | IU01 & BU |
| 1F | 153 | mfspr | Move from special purpose register | Emulated | IU01 & BU |
| 1F | 1D3 | mtspr | Move to special purpose register | Emulated | IU01 & BU |
| | | | | Emulated | IU01 & BU |

Appendix-continued

PowerPC ™ RISC Instruction Set

| | | | | Emulated | IU01 & BU |
|---|---|---|---|---|---|
| | | | Other user-mode instructions | | |
| 1F | 36 | dcbst | Data cache block store | Emulated | IU01 & BU |
| 1F | 56 | dcbf | Data cache block flush | Emulated | IU01 & BU |
| 1F | F6 | dcbtst | Data cache block touch for store | Emulated | IU01 & BU |
| 1F | 116 | dcbt | Data cache block touch | Emulated | IU01 & BU |
| 1F | 1D6 | dcbi | Data cache block invalidate | Emulated | IU01 & BU |
| 1F | 3F6 | dcbz | Data cache block zero | Emulated | IU01 & BU |
| 1F | 3D6 | icbi | Instruction cache block invalidate | Emulated | IU01 & BU |
| 1F | 356 | eieio | Enforce in-order I/O execution | Emulated | IU01 & BU |
| 1F | 256 | sync | Synchronize | Emulated | IU01 & BU |
| 1F | 136 | eciwx | External control input word indexed | Emulated | IU01 & BU |
| 1F | 1B6 | ecowx | External control output word indexed | Emulated | IU01 & BU |
| | | | Other instructions | | |
| 1F | 73 | mfpmr | Move from program mode register | | |
| 1F | B2 | mtpmr | Move to program mode register | | |
| | | | Floating point instructions | | |
| 3B | 12 | fdivsx | FP SP Divide | Hardware | FU |
| 3B | 14 | fsubsx | FP SP Subtract | Hardware | FU |
| 3B | 15 | faddsx | FP SP Add | Hardware | FU |
| 3B | 16 | frsqrtsx | FP SP Square root | not impl. | IU01 & BU |
| 3B | 19 | fmulsx | FP SP Multiply | Hardware | FU |
| 3B | 1C | fmsubsx | FP SP Multiply-Subtract | Hardware | FU |
| 3B | 1D | fmaddsx | FP SP Multiply-Add | Hardware | FU |
| 3B | 1E | fnmsubsx | FP SP Neg-Mult-Subtract | Hardware | FU |
| 3B | 1F | fnmaddsx | FP SP Net-Mult-Add | Hardware | FU |
| 3F | 12 | fdivx | FP DP Divide | Hardware | FU |
| 3F | 14 | fsubx | FP DP Subtract | Hardware | FU |
| 3F | 15 | faddx | FP DP Add | Hardware | FU |
| 3F | 16 | fsqrtx | FP DP Square root | not impl. | IU01 & BU |
| 3F | 19 | fmulx | FP DP Multiply | Hardware | FU |
| 3F | 1C | fmsubx | FP DP Multiply-Subtract | Hardware | FU |
| 3F | 1D | fmaddx | FP DP Multiply-Add | Hardware | FU |
| 3F | 1E | fnmsubx | FP DP Neg-Mult-Subtract | Hardware | FU |
| 3F | 1F | fnmaddx | FP DP Net-Mult-Add | Hardware | FU |
| 3B | 18 | fresx | FP SP Reciprocal estimate | not impl. | IU01 & BU |
| 3F | 0 | fcmpu | FP Compare unordered | Hardware | FU |
| 3F | C | frspx | FP Round to SP | Hardware | FU |
| 3F | E | fctiwx | FP Convert to integer word | Hardware | FU |
| 3F | F | fctiwzx | FP Convert to integer word and round toward zero | Hardware | FU |
| 3F | 17 | fselx | FP Select | not impl. | IU01 & BU |
| 3F | 1A | frsqrtex | RP Reciprocal square root estimate | not impl. | IU01 & BU |
| 3F | 20 | fcmpo | FP Compare ordered | Hardware | FU |

Appendix-continued

| | | | PowerPC™ RISC Instruction Set | | |
|----|-----|--------|--------------------------|----------|----|
| 3F | 28  | fnegx  | FP Negate                | Hardware | FU |
| 3F | 48  | fmrx   | FP Move register         | Hardware | FU |
| 3F | 108 | fnabsx | FP Negative absolute value | Hardware | FU |
| 3F | 147 | fabsx  | FP Absolute value        | Hardware | FU |

We claim:

1. A method for emulating calls from a user program to an operating system, said method comprising:

executing a plurality of user instructions from said user program, said user instructions belonging to a first instruction set;

decoding a call instruction in said user program, said call instruction calling a service routine in an operating system, wherein said call instruction in said user program is a far jump instruction;

loading a pointer to a code segment, said code segment containing said service routine in said operating system, said pointer having an instruction set indicating means for indicating an instruction set for said service routine;

executing service routine instructions in said code segment, decoding service routine instructions with a first instruction decoder when said instruction set indicating means indicates said first instruction set, decoding service routine instructions with a second instruction decoder when said instruction set indicating means indicates a second instruction set, said first instruction decoder for decoding only a portion of said first instruction set;

returning control to said user program when a return instruction is executed in said service routine;

whereby said user program containing instructions in said first instruction set calls said service routine in said operating system, said service routine having instructions from said second instruction set, said pointer to said code segment indicating if said service routine contains instructions from said second instruction set or said first instruction set.

2. The method of claim 1 wherein said operating system emulates the DOS™ operating system.

3. The method of claim 1 wherein said operating system emulates the WINDOWS™ operating system.

4. The method of claim 1 wherein said first instruction set is an x86 CISC instruction set and said second instruction set is a RISC instruction set.

5. The method of claim 1 wherein said first instruction set is an x86 CISC instruction set and said second instruction set is the PowerPC™ RISC instruction set.

6. A method for emulating calls within a user program, said method comprising:

executing a plurality of user instructions from said user program, said user instructions belonging to a first instruction set;

decoding a call instruction in said user program, said call instruction calling a service routine in said user program, wherein said call instruction in said user program is a far jump instruction;

loading a pointer to a code segment, said code segment containing said service routine in said user program, said pointer having an instruction set indicating means for indicating an instruction set for said service routine;

executing service routine instructions in said code segment, decoding service routine instructions with a first instruction decoder when said instruction set indicating means indicates said first instruction set, decoding service routine instructions with a second instruction decoder when said instruction set indicating means indicates a second instruction set, said first instruction decoder for decoding only a portion of said first instruction set;

returning control to said user program when a return instruction is executed in said service routine;

whereby said user program containing instructions in said first instruction set calls said service routine in said user program, said service routine having instructions from said second instruction set, said pointer to said code segment indicating if said service routine contains instructions from said second instruction set or said first instruction set.

* * * * *